United States Patent
Motomura

(10) Patent No.: US 6,633,728 B2
(45) Date of Patent: Oct. 14, 2003

(54) FLASH DEVICE, LENS-FITTED PHOTO FILM UNIT, CAMERA, AND PRODUCING METHOD FOR THE SAME

(75) Inventor: Katsumi Motomura, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 64 days.

(21) Appl. No.: 09/956,984

(22) Filed: Sep. 21, 2001

(65) Prior Publication Data

US 2002/0041759 A1 Apr. 11, 2002

(30) Foreign Application Priority Data

Sep. 25, 2000 (JP) .......................... 2000-290048
Sep. 25, 2000 (JP) .......................... 2000-290059
Sep. 25, 2000 (JP) .......................... 2000-290060
Sep. 11, 2001 (JP) .......................... 2001-275045

(51) Int. Cl.[7] .............................................. G03B 15/05
(52) U.S. Cl. .......................... 396/6; 396/159; 396/176; 396/206
(58) Field of Search ................................ 396/159–163, 396/205, 206, 6, 176; 315/241 P, 151

(56) References Cited

U.S. PATENT DOCUMENTS 6,466,744 B1 * 10/2002 Hosaka et al. .......... 396/206 X
2002/0012534 A1 * 1/2002 Kibayashi et al. .......... 396/205

* cited by examiner

Primary Examiner—W. B. Perkey
(74) Attorney, Agent, or Firm—Young & Thompson

(57) ABSTRACT

In a lens-fitted photo film unit, a flash device has a booster circuit including primary and secondary windings, the secondary winding generating high voltage when power source voltage is applied to the primary winding. A main capacitor is charged by the high voltage in the secondary winding. A flash discharge tube is connected in parallel with the main capacitor, for emitting flash light upon discharge with electric energy from the main capacitor. A trigger circuit discharges the flash discharge tube upon a switching operation. A photo transistor measures reflected light from an object illuminated by the flash light, to output a light amount signal. A light amount control circuit quenches discharge of the flash discharge tube when an integration value of the light amount signal comes up to a predetermined value. A powering voltage generator circuit is connected with the secondary winding, for generating powering voltage adapted for powering the light amount control circuit in response to operation of the trigger circuit.

29 Claims, 14 Drawing Sheets

FLASH DEVICE, LENS-FITTED PHOTO FILM UNIT, CAMERA, AND PRODUCING METHOD FOR THE SAME

BACKGROUND OF THE INVENTION

1. Field of the Invention

The present invention relates to a flash device, lens-fitted photo film unit, camera, and producing method for the same. More particularly, the present invention relates to a flash device in which a light amount control circuit can be powered by a simple construction, lens-fitted photo film unit, camera, and producing method for the same.

2. Description Related to the Prior Art

One of simple types of cameras is a lens-fitted photo film unit, which has a housing including a taking lens and a shutter mechanism, and is pre-loaded with unexposed photo film. In order to take an exposure at night or indoors, there is a type of the lens-fitted photo film unit in which an electronic flash device is incorporated.

In the flash device used in the lens-fitted photo film unit of the presently available type, flash light of a predetermined amount is applied to a photographic object irrespective of an object distance. If the object is at a near distance, the object is photographed in an overexposed state. There occurs a problem in that the object is reproduced in a photographic print in too low a density and too bright a state in which the object is visibly indistinct. Also, a background is photographed too darkly even when the object is reproduced properly.

In a compact camera, an automatic flash device is used as the flash device, and can operate for automatically adjusting an amount of light. A flash discharge tube is driven to emit flash light in the automatic flash device. Immediately, a photo receptor element such as a photo transistor receives flash light reflected by the object. The automatic flash device effects calculation of integration of a photoelectric current generated by the photo receptor element upon receiving the flash light. When the integrated amount comes up to a predetermined level, a thyristor as a non-contact switch is turned on to quench discharge of the flash discharge tube. Light emission of the flash discharge tube is discontinued. Therefore, the flash light amount can be controlled appropriately according to the object distance of the object.

When the automatic flash device mentioned above is used, a specialized power source circuit is used in a camera or the like, because it requires voltage of several volts higher than a power source of a dry battery for the purpose of energizing the photo receptor element, the thyristor and the like. However, a combination of a light amount control circuit with the lens-fitted photo film unit has a problem in that no known construction can suitably convert voltage of 1.5 volts to sufficiently high voltage for the light amount control circuit. The specialized power source circuit used in a camera has a considerable size and is expensive, and inconsistent to the features of the lens-fitted photo film unit which should be simple.

SUMMARY OF THE INVENTION

In view of the foregoing problems, an object of the present invention is to provide a flash device in which a light amount control circuit can be powered by a simple construction, lens-fitted photo film unit, camera, and producing method for the same.

In order to achieve the above and other objects and advantages of this invention, a flash device has a booster circuit including primary and secondary windings, the secondary winding generating high voltage when power source voltage is applied to the primary winding. A main capacitor is charged by the high voltage in the secondary winding. A flash discharge tube is connected in parallel with the main capacitor, for emitting flash light upon discharge with electric energy from the main capacitor. A trigger circuit discharges the flash discharge tube upon a switching operation. A photo receptor element measures reflected light from an object illuminated by the flash light, to output a light amount signal. A light amount control circuit quenches discharge of the flash discharge tube when an integration value of the light amount signal comes up to a predetermined value. A powering voltage generator circuit is connected with the secondary winding, for generating powering voltage adapted for powering the light amount control circuit in response to operation of the trigger circuit.

The light amount control circuit includes a first capacitor for integration of the light amount signal. A first switching element becomes conductive when voltage across the first capacitor comes up to the predetermined value. A second capacitor is charged by application of the powering voltage, and is discharged upon rendering the first switching element conductive. A second switching element becomes conductive upon discharge of the second capacitor, to quench emission of the flash light from the main capacitor by discharging the main capacitor.

The powering voltage generator circuit includes a driving capacitor for being charged by the high voltage in the secondary winding, and for being discharged through the flash discharge tube in response to operation of the trigger circuit. A Zener diode is connected in series with the driving capacitor, for generating the powering voltage upon discharge of the driving capacitor.

The photo receptor element is a photo transistor, connected in series with the first capacitor, for being supplied with the powering voltage by the powering voltage generator circuit, to generate a current constituting the light amount signal according to the object light amount.

The first switching element is a first thyristor having a first gate, connected in parallel with a series of the photo transistor and the first capacitor, the first gate being connected with a juncture point between the photo transistor and the first capacitor. The second switching element is a second thyristor having a second gate, connected in parallel with the main capacitor, the second gate being connected with the second capacitor.

Furthermore, a choke coil is connected between an anode of the second thyristor and the main capacitor, for protecting the second thyristor by preventing a current from flowing at a high frequency from the main capacitor to the second thyristor.

The flash discharge tube has one end connected between the choke coil and an anode of the second thyristor.

Furthermore, a time adjusting capacitor is connected in series with the first thyristor, for increasing time before rendering the first thyristor conductive.

Furthermore, a front wall is provided. A flash emitter is secured to the front wall, for containing the flash discharge tube, to emit the flash light to the object. A charging operation portion is disposed in the front wall, for being externally actuated, to turn on the booster circuit.

Furthermore, a sync switch has a pair of switch segments for being shifted to a contacted state by a shutter mechanism upon actuation thereof, to switch on the trigger circuit.

In one aspect of the invention, a lens-fitted photo film unit includes a main body pre-loaded with photo film. A booster circuit includes primary and secondary windings, the secondary winding generating high voltage when power source voltage is applied to the primary winding. A main capacitor is charged by the high voltage in the secondary winding. A flash discharge tube is connected in parallel with the main capacitor, for emitting flash light upon discharge with electric energy from the main capacitor. A trigger circuit discharges the flash discharge tube upon a switching operation. A photo receptor element measures reflected light from an object illuminated by the flash light, to output a light amount signal. A light amount control circuit quenches discharge of the flash discharge tube when an integration value of the light amount signal comes up to a predetermined value. A powering voltage generator circuit is connected with the secondary winding, for generating powering voltage adapted for powering the light amount control circuit in response to operation of the trigger circuit.

The photo receptor element is disposed on a front side of the main body. Furthermore, a front cover covers the front side of the main body. A photometric window is formed in the front cover, for passing the reflected light from the object to the photo receptor element.

Furthermore, a flash circuit board has the booster circuit, the main capacitor, the flash discharge tube, the trigger circuit, the photo transistor, the light amount control circuit, and the powering voltage generator circuit. A positioning mechanism positions the flash circuit board between the main body and the front cover.

Furthermore, a battery is contained in the main body, for generating the power source voltage.

In another aspect of the invention a camera is provided instead of the lens-fitted photo film unit.

In a further aspect of the invention, a lens-fitted photo film unit producing method for producing a lens-fitted photo film unit is provided. In the lens-fitted photo film unit producing method, the flash circuit board is secured to the main body. The front cover is secured to the main body in positioning the photometric window at the photo receptor element in the main body, and in positioning the charging operation portion at the flash circuit board in the main body.

Furthermore, a shutter mechanism is secured to the main body, the shutter mechanism including a shutter blade for providing an exposure to the photo film. A sync switch is secured to the main body in a predetermined position relative to the shutter blade in the main body before the front cover is secured to the main body, the sync switch being shifted to a contacted state by a portion of the shutter blade upon actuation of the shutter mechanism, to switch on the trigger circuit.

Furthermore, a photo film cassette is inserted in a cassette loading chamber in the main body. In the step of inserting the photo film cassette, the photo film is inserted into a photo film chamber in the main body in a form wound as the roll after being drawn from the photo film cassette. After the steps of inserting the photo film cassette and the photo film, the rear cover is secured to the main body before the step of securing the front cover, wherein the rear cover closes the cassette loading chamber and the photo film chamber.

In an additional preferred embodiment, a flash device comprising an oscillation transformer, including primary and secondary windings coupled with each other in mutual induction, there occurring an induction current flowing in a secondary winding upon flowing of a current in the primary winding, the induction current adapted for charging a main capacitor. A flash discharge tube is triggered by application of trigger voltage, for emitting flash light by discharging the main capacitor being charged. A light amount control circuit receives the flash light reflected by an object to be photographed, and quenches discharge of the flash discharge tube when an amount of the received reflected flash light comes up to a predetermined level. A driving capacitor is charged by back electromotive force generated in the primary winding, and generates powering voltage adapted for powering the light amount control circuit in emitting the flash light.

In a further preferred embodiment, a flash device includes an oscillation transformer, including primary, secondary and tertiary windings coupled with one other in mutual induction, there occurring an induction current flowing in a secondary winding upon flowing of a current in the primary winding, the induction current adapted for charging a main capacitor. A flash discharge tube is triggered by application of trigger voltage, for emitting flash light by discharging the main capacitor being charged. A light amount control circuit receives the flash light reflected by an object to be photographed, and quenches discharge of the flash discharge tube when an amount of the received reflected flash light comes up to a predetermined level. A driving capacitor is charged by electromotive force of induction generated in the tertiary winding by changes in a current flowing in the secondary winding, and generates powering voltage adapted for powering the light amount control circuit in emitting the flash light.

According to the present invention, the light amount control circuit can be powered by a simple construction, because the high voltage generated by the secondary winding in the flash control circuit can be utilized in a simple construction.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
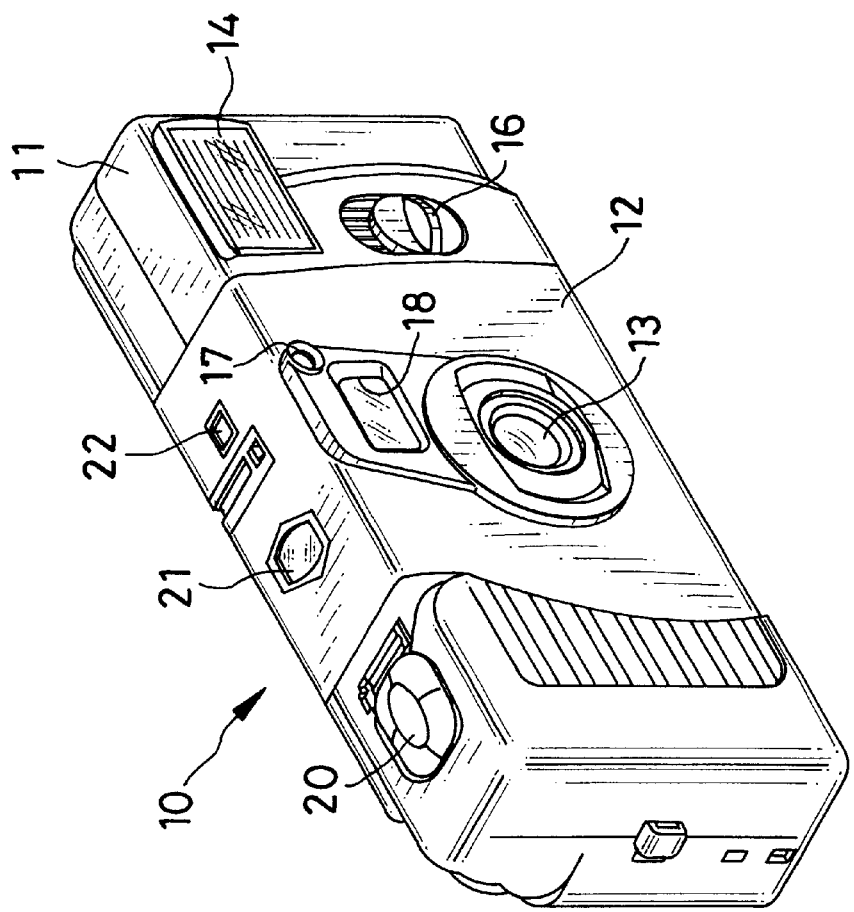
FIG. 1 is a perspective illustrating a lens-fitted photo film unit.

In FIG. 1, a lens-fitted photo film unit 10 as camera is constituted by a housing 11 and a packaging sticker belt 12 wrapped on a central portion of the housing 11. There are a shutter device, photo film advancing mechanism, and the like incorporated in the housing 11, which is pre-loaded with a photo film cassette of which photo film is drawn, wound in a roll form and inserted in the housing 11.

A front side of the housing 11 includes openings for positions of a taking lens 13, a flash emitter 14 and a charging operation button 16 as charging operation portion, and also has a photometric window 17 and a viewfinder objective window 18 for a viewfinder lens. An upper side of the housing 11 has a shutter release button 20, a frame counter 21 and a charge completion indicator 22. A rear side of the housing 11 has a winder wheel 28 for advancing photo film by one frame. See FIG. 2. Also, a viewfinder eyepiece window is disposed.

Figure 3:
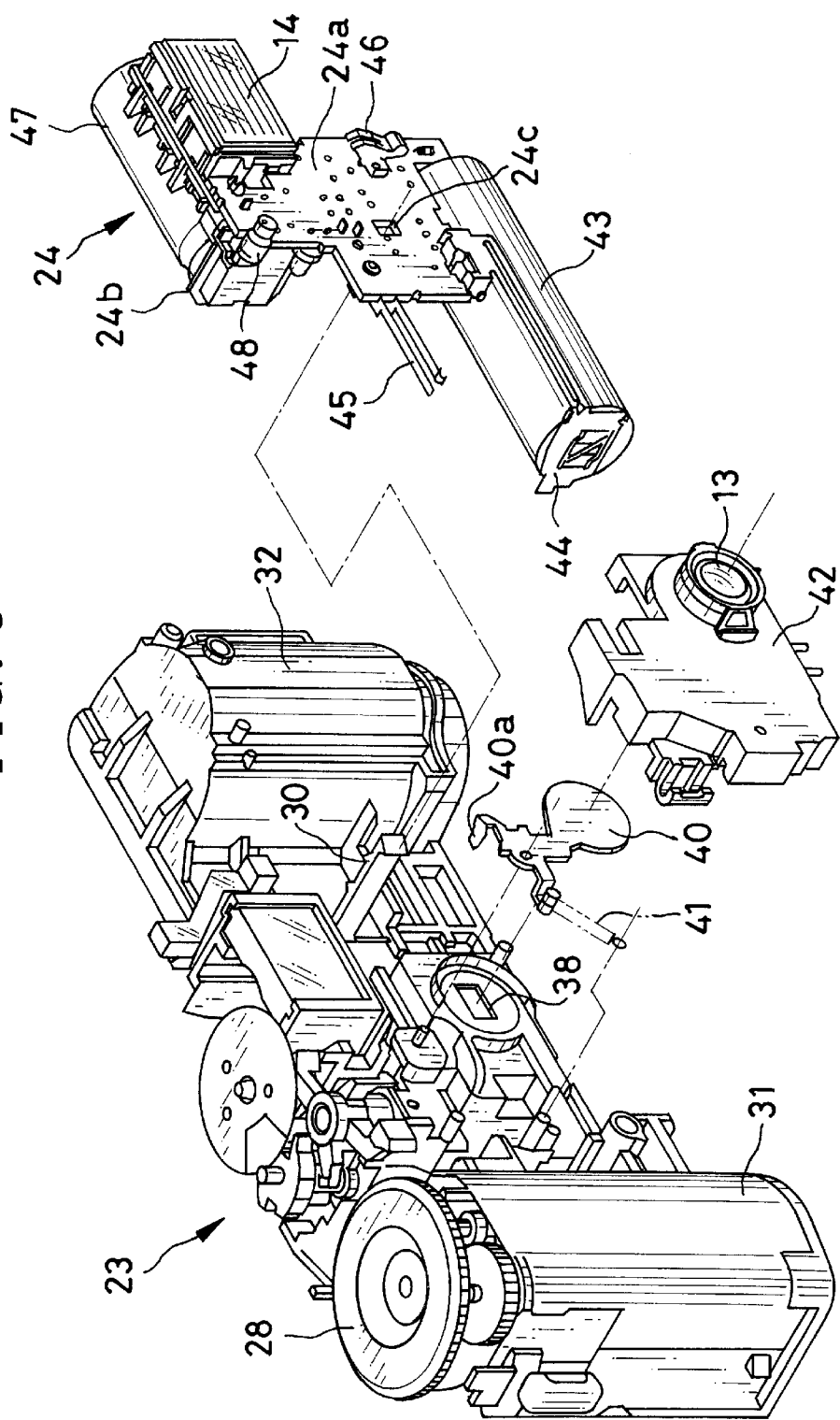
FIG. 3 is an exploded perspective illustrating a main body with a flash device.

The charging operation button 16 is kept slidable up and down. A charger switch 46 as illustrated in FIG. 3 is turned on when the charging operation button 16 is slid up, to start charging the flash device. When the shutter release button 20 is depressed after completion of the charging, one exposure is taken. Flash light is emitted toward the object by the flash emitter 14. A photo transistor 48 as photo receptor element is disposed in a position inside the photometric window 17 as illustrated in FIG. 3. When flash light is emitted, the photo transistor 48 receives flash light reflected by a principal object.

Figure 2:
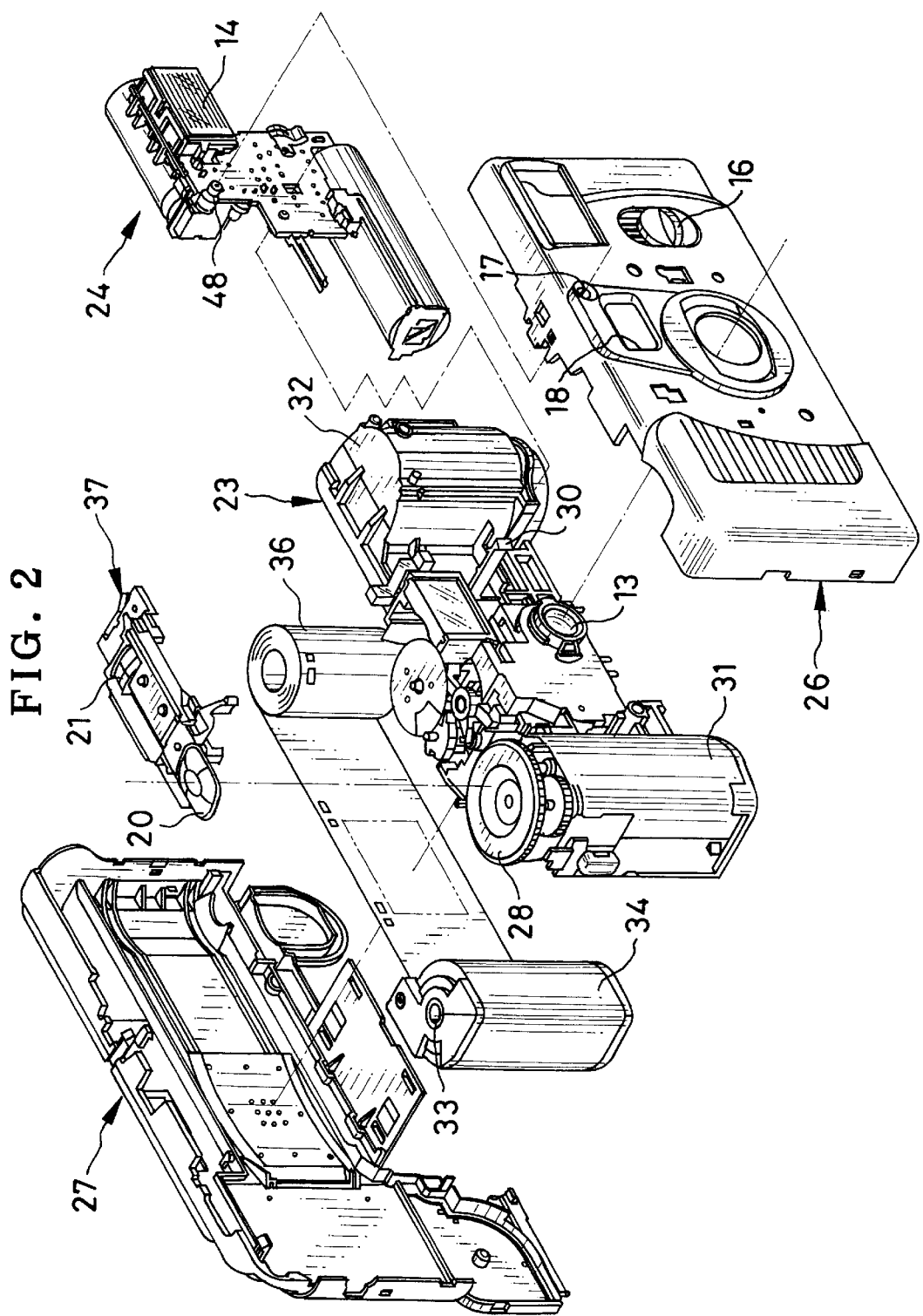
FIG. 2 is an exploded perspective illustrating the lens-fitted photo film unit.

In FIG. 2, the housing 11 includes a main body 23, an electronic flash device 24, and a front cover 26 and a rear cover 27. As is well-known in the art, the main body 23 includes a shutter mechanism, a shutter charge mechanism and a photo film advancing mechanism. In FIG. 3, a shutter blade 40 is knocked in the shutter mechanism to take an exposure. The shutter charge mechanism is actuated by rotation of the winder wheel 28, and charges force for knocking the shutter blade 40. The photo film advancing mechanism winds the photo film by one frame upon one rotation of the winder wheel 28. The flash device 24 is a unified structure including the flash emitter 14, the photo transistor 48 and the like mounted on a circuit board. A positioning hook 30 as positioning mechanism of the main body 23 keeps the flash device 24 positioned between the front cover 26 and the main body 23.

The main body 23 is constituted by a plastic molded piece having a cassette loading chamber 31 and a photo film chamber 32. A photo film cassette 34 is inserted in the cassette loading chamber 31, and has a spool 33 engaged with a shaft of the winder wheel 28. Photo film 36 is drawn out of the photo film cassette 34, wound in a form of a roll, which is inserted in the photo film chamber 32. When the winder wheel 28 is rotated, photo film is fed into the photo film cassette 34 by one frame. The shutter charge mechanism is actuated to get ready for taking an exposure.

A top plate 37 of resin is secured to the top of the main body 23. The top plate 37 includes an opaque plate member having the shutter release button 20 formed therewith, and a transparent plate member having the frame counter 21 formed therewith.

In FIG. 3, a shutter opening 38 is formed in a light-shielded tunnel as a portion of the main body 23. An exposure aperture is defined as a rear opening of the light-shielded tunnel to determine a region of exposing the photo film. The shutter blade 40 is disposed in front of the light-shielded tunnel for opening and closing the shutter opening 38. A pin protrudes from the main body 23 and positions the shutter blade 40. A tension coil spring 41 biases the shutter blade 40 to close the shutter opening 38. A shutter cover 42 is an element constituting a lens holder which supports the taking lens 13. The shutter cover 42 covers the shutter blade 40 in a light-tight manner.

The flash device 24 includes a main flash circuit board 24a and a subsidiary flash circuit board 24b. The main flash circuit board 24a has a flash control circuit or booster circuit, and the like included in the flash device. The subsidiary flash circuit board 24b is fixed in an orientation vertical to the main flash circuit board 24a. A positioning hole 24c as positioning mechanism is formed in the main flash circuit board 24a, and receives insertion of the positioning hook 30 of the main body 23, to keep the flash device 24 positioned on the front side of the main body 23. The main flash circuit board 24a has a battery holder 44, the flash emitter 14, a sync switch 45, the charger switch 46, a main capacitor 47 and the like mounted thereon. A dry battery 43 is held by the battery holder 44. Also, the photo transistor 48 is mounted on the subsidiary flash circuit board 24b for receiving reflected flash light. The photo transistor 48 is positioned inside the photometric window 17, and generates a photoelectric current according to intensity of the received light from the object.

Figure 4:
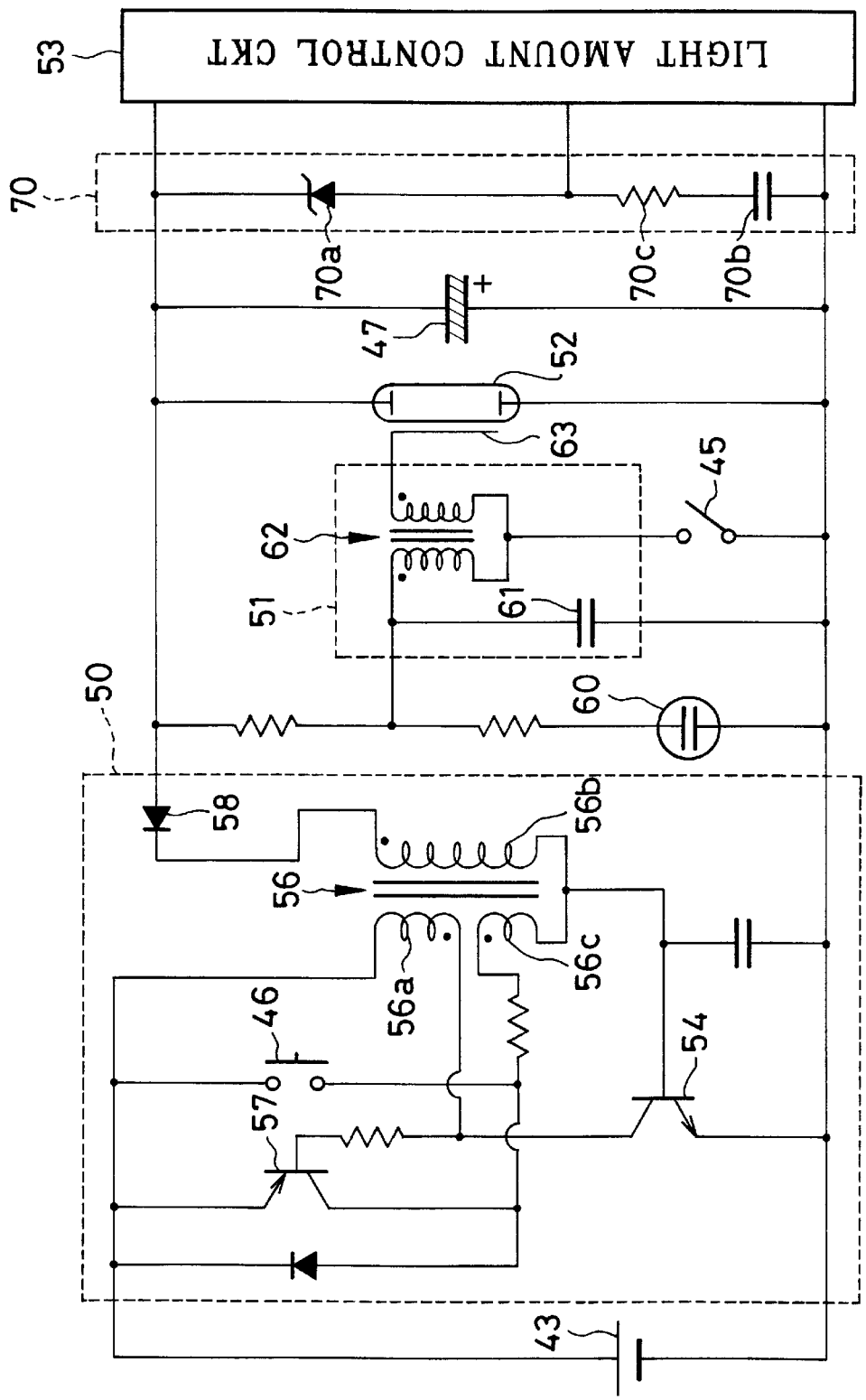
FIG. 4 is a schematic diagram illustrating arrangement of circuits including a flash control circuit and a flash discharge tube.

In FIG. 4, circuit arrangement of the flash device 24 is depicted. The flash device 24 includes a booster circuit 50, a trigger circuit 51, the main capacitor 47, a flash discharge tube 52 and a light amount control circuit 53. An example of the dry battery 43 is the UM-3 type of which electromotive force is 1.5 volts. The battery holder 44 keeps the dry battery 43 positioned in the housing 11.

The booster circuit 50 includes the charger switch 46, an oscillation transistor 54, an oscillation transformer 56, a latch transistor 57, a rectifier diode 58 and the like. The oscillation transistor 54 and the oscillation transformer 56 constitute a blocking oscillator known in the art. High voltage is generated in the secondary winding in the oscillation transformer 56 while the blocking oscillator is operated, so as to cause the main capacitor 47 to store charge.

The oscillation transformer 56 includes a primary winding 56a, a secondary winding 56b coupled with the primary winding 56a in mutual induction, and a tertiary winding 56c coupled with the secondary winding 56b in mutual induction. An end of the secondary winding 56b is connected with an end of the tertiary winding 56c as a juncture. A collector of the oscillation transistor 54 is connected with an end of the primary winding 56a. A base of the oscillation transistor 54 is connected with the juncture between the secondary winding 56b and the tertiary winding 56c. The latch transistor 57 has a base connected with a collector of the oscillation transistor 54, and has a collector connected with the tertiary winding 56c.

When the charger switch 46 is turned on, the voltage of the dry battery 43 is applied between a base and emitter of the oscillation transistor 54 via the tertiary winding 56c, so as to render the oscillation transistor 54 conductive. A collector current of the oscillation transistor 54 flows into the primary winding 56a in accordance with an amount of the base current. Electromotive force of 300 volts or so occurs in the secondary winding 56b as high voltage according to a ratio between numbers of the windings. According to the electromotive force, a current on the secondary side flows through the rectifier diode 58, and charges the main capacitor 47.

The latch transistor 57 is rendered conductive by a collector current which flows when the oscillation transistor 54 becomes conductive. In response this, a current from the dry battery 43 flows to a base of the oscillation transistor 54 through the latch transistor 57 and the tertiary winding 56c, so that a base current increases. This is the positive feedback loop which causes oscillation at the oscillation transistor 54, to increase currents in primary and secondary sides of the oscillation transformer 56.

The main capacitor 47 is connected between the emitter of the oscillation transistor 54 and the anode of the rectifier diode 58, and is charged by a current output by the booster circuit 50. The main capacitor 47 is charged in such a negative manner that the potential on the side of the oscillation transistor 54 is constant and that the potential on the anode side of the rectifier diode 58 is lower.

A neon tube 60 is turned on when the main capacitor 47 becomes charged until a voltage across the same comes up to a predetermined voltage level. Light emitted by the neon tube 60 is guided by a light guide member to the charge completion indicator 22. A user of the camera is caused to recognize the completion of charging by the light from the neon tube 60 at the charge completion indicator 22. It is to be noted that an LED or light emitting element may be used instead of the neon tube 60.

Figure 5A:
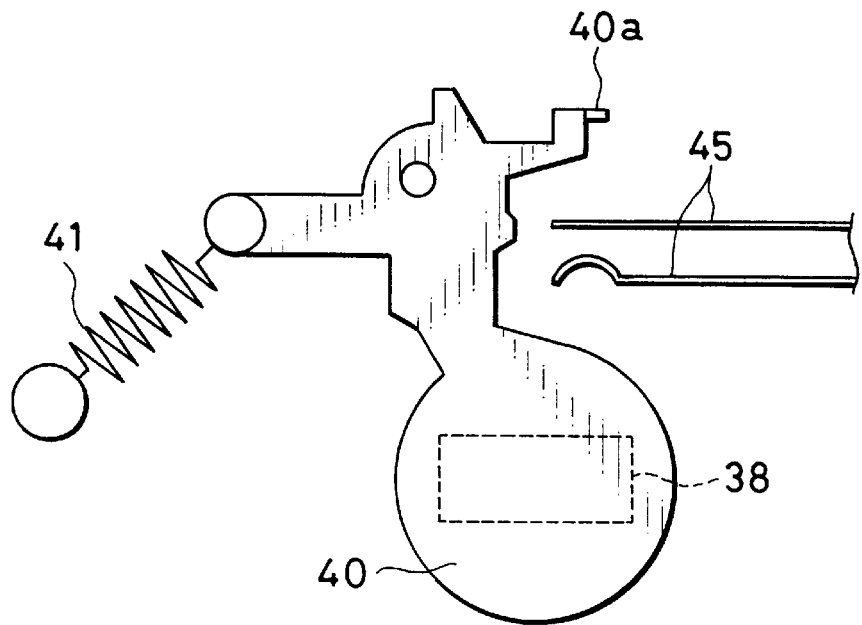
FIG. 5A is a front elevation illustrating a closed position of a shutter blade relative to a sync switch.
Figure 5B:
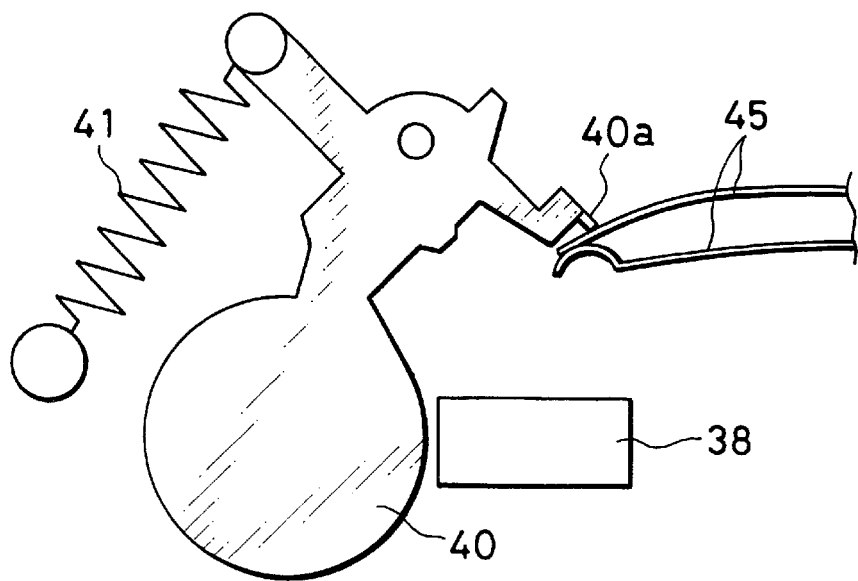
FIG. 5B is a front elevation illustrating an open position of the shutter blade.

The trigger circuit 51 is constituted by a trigger capacitor 61 and a trigger transformer 62 connected with the sync switch 45. The trigger capacitor 61 is charged by the output current of the booster circuit 50. When the shutter release button 20 is depressed, the shutter blade 40 rotates from the closed position of FIG. 5A. A projection 40a of the shutter blade 40 pushes and turns on the sync switch 45. See FIG. 5B. A current from the trigger capacitor 61 flows into a primary side of the trigger transformer 62. A trigger voltage of approximately 4 kV occurs in a secondary winding of the trigger transformer 62. A trigger electrode 63 is connected for applying the trigger voltage to the flash discharge tube 52. Therefore, insulation between the electrodes of the flash discharge tube 52 is broken to discharge the main capacitor 47, so flash light is emitted toward a photographic object by the flash emitter 14.

Figure 6:
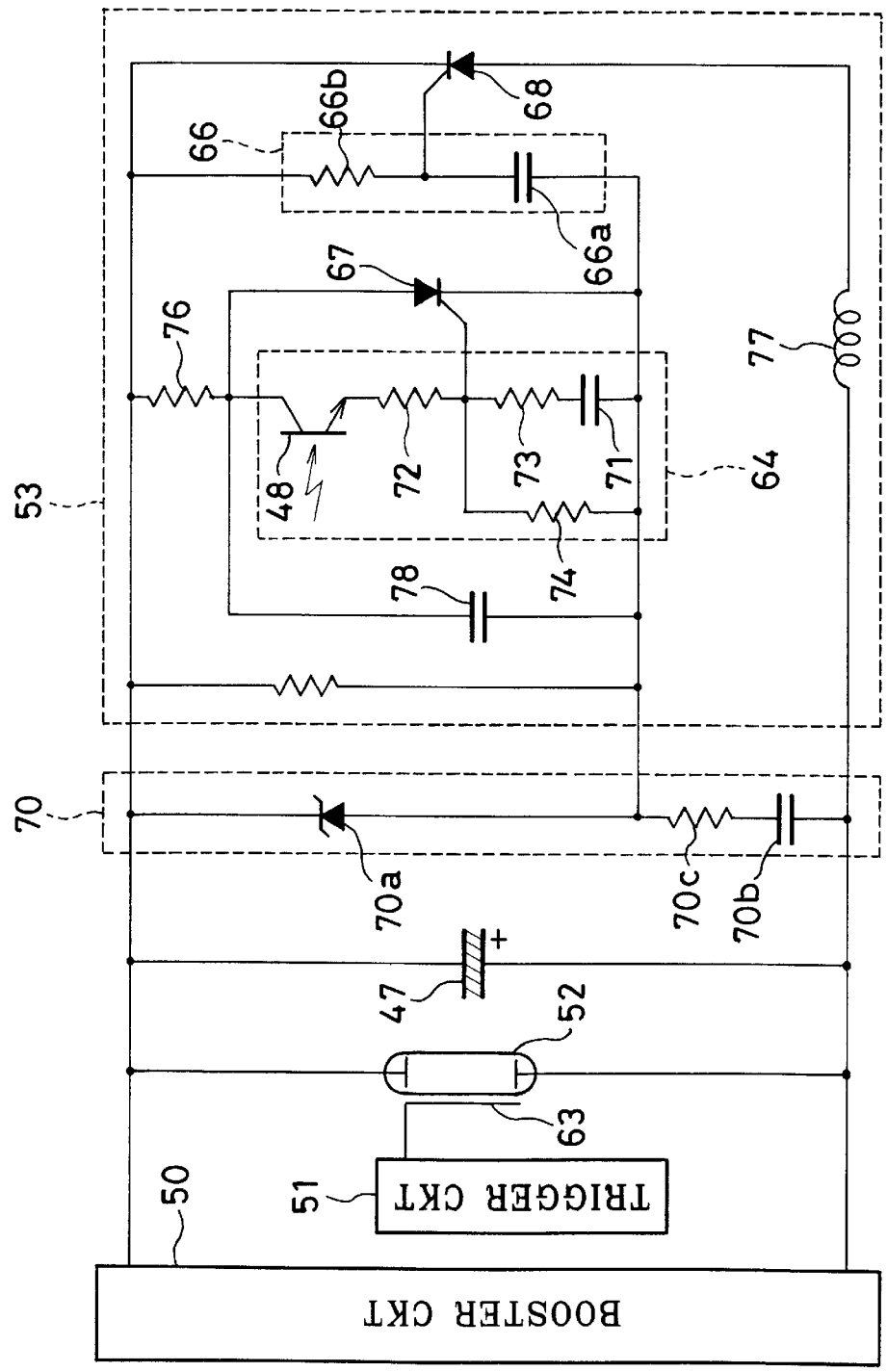
FIG. 6 is a schematic diagram illustrating arrangement of the circuits including a light amount control circuit and a powering voltage generator circuit.

In FIG. 6, the light amount control circuit 53 includes a signal converter 64, a quenching circuit 66 or voltage generator circuit, a quenching thyristor 67 as first switching element, and a discharging thyristor 68 as second switching element. The thyristors 67 and 68 are silicon controlled rectifiers (SCR) having three terminals. A powering voltage generator circuit 70 is connected with the light amount control circuit 53, and includes a Zener diode 70a, a driving capacitor 70b and a resistor 70c. The powering voltage generator circuit 70 applies powering voltage to the light amount control circuit 53, and powers the light amount control circuit 53.

The driving capacitor 70b is charged together with the main capacitor 47 by the current output by the booster circuit 50. The driving capacitor 70b is charged in such a negative manner that the potential on the anode side of the Zener diode 70a is lower. Voltage across the driving capacitor 70b is equal to that of the main capacitor 47.

The Zener diode 70a is a type of which a Zener voltage is for example 6 volts, and is connected in parallel with the light amount control circuit 53. When a trigger voltage is applied to the flash discharge tube 52, charge stored in the driving capacitor 70b is discharged in a path through the flash discharge tube 52, the Zener diode 70a and the resistor 70c. In the discharging step, the voltage across the driving capacitor 70b is applied to the Zener diode 70a as voltage in a reverse direction. Thus, a potential difference occurs between an anode and cathode of the Zener diode 70a as Zener voltage. The potential difference is output as powering voltage to drive the light amount control circuit 53.

The signal converter 64 includes the photo transistor 48, a signal converting capacitor 71 and resistors 72–74. A collector of the photo transistor 48 is connected with the cathode of the Zener diode 70a via the oscillation transformer 56. The signal converting capacitor 71 and the resistors 72 and 73 are connected serially between an emitter of the photo transistor 48 and an anode of the Zener diode 70a. The resistor 74 is connected between the anode of the Zener diode 70a and a juncture between the resistors 72 and 73.

As described above, the photo transistor 48 receives flash light reflected by the object, and generates a photoelectric current according to intensity of the received flash light. The signal converting capacitor 71 is charged by the photoelectric current. The voltage across the same is according to an amount of the received light. Note that a photodiode or other photo receptor elements may be used instead of the photo transistor 48.

An anode of the quenching thyristor 67 is connected with a cathode of the Zener diode 70a via the resistor 74. A cathode of the quenching thyristor 67 is connected with one electrode of the signal converting capacitor 71. The gate of the quenching thyristor 67 is connected to a remaining electrode of the signal converting capacitor 71 via the resistor 73. Voltage across the signal converting capacitor 71 is applied between the gate and cathode of the quenching thyristor 67. When the voltage across the signal converting capacitor 71 becomes equal to or higher than a threshold level, the quenching thyristor 67 is rendered conductive.

The quenching circuit 66 includes a capacitor 66a and a resistor 66b connected in series, and is connected in parallel with the quenching thyristor 67. The voltage across the Zener diode 70a causes a current to flow in the resistor 66b, and charges the capacitor 66a. When the quenching thyristor 67 becomes conductive, the capacitor 66a is discharged in a path with the resistor 66b, a resistor 76, and a path between the anode and cathode of the quenching thyristor 67.

A gate and cathode of the discharging thyristor 68 are connected to respectively ends of the resistor 66b. A choke coil 77 is connected between an anode of the discharging thyristor 68 and the main capacitor 47. When the capacitor 66a is discharged, a gate voltage is generated across the resistor 66b, and is applied between the gate and cathode of the discharging thyristor 68. Thus, the discharging thyristor 68 becomes conductive. As the discharging thyristor 68 is connected in parallel with the flash discharge tube 52, the main capacitor 47 is discharged in a path through the discharging thyristor 68, which has a lower impedance than the flash discharge tube 52. Emission of light at the flash discharge tube 52 is quenched.

As high voltage has been applied to the main capacitor 47, it is likely that the discharging thyristor 68 is destroyed by an instantaneous flow of a current between the anode and cathode of the discharging thyristor 68 when the discharging thyristor 68 becomes conductive. In order to avoid such a problem, the choke coil 77 is connected between the main capacitor 47 and the discharging thyristor 68, to keep gradual the flow of the current to the discharging thyristor 68.

Also, a time adjusting capacitor 78 is used in the light amount control circuit 53 and connected in parallel with the signal converter 64 for the purpose of lowering performance of the signal converter 64. A current flows into the time adjusting capacitor 78 through the resistor 76, and charges the time adjusting capacitor 78 with an increase in the voltage across the same. In a period after the start of flash emission and until lapse of a predetermined time, voltage applied to the signal converter 64 becomes low to decrease a photoelectric current flowing in the photo transistor 48. An increase in the voltage across the signal converting capacitor 71 is slowed. This prolongs the time required for the quenching thyristor 67 to become conductive. Consequently, there is no fear of rendering the quenching thyristor 67 conductive until voltage across the capacitor 66a becomes as high as the threshold level. The discharging thyristor 68 can be rendered conductive reliably.

The operation of the above construction is described now. To take a photograph at night or indoors, a user slides the charging operation button 16. The charger switch 46 is turned on to start operation of the booster circuit 50, of which the secondary winding outputs high voltage to charge the main capacitor 47, the trigger capacitor 61 and the driving capacitor 70b. When the voltage across the main capacitor 47 comes up to the predetermined voltage level, the neon tube 60 emits light. The user checks the light of the neon tube 60 at the charge completion indicator 22, frames a photographic field through the viewfinder, and depresses the shutter release button 20 to take an exposure.

As the shutter release button 20 is depressed, the shutter blade 40 is opened and closed. The sync switch 45 is turned on. Trigger voltage generated by the trigger transformer 62 is applied to the flash discharge tube 52, so the main capacitor 47 is discharged through the flash discharge tube 52. Flash light is generated by the flash discharge tube 52 and directed by the flash emitter 14 toward an object.

Upon discharging the main capacitor 47, a current from the driving capacitor 70b flows to the Zener diode 70a and to the flash discharge tube 52. A Zener voltage of a predetermined level occurs across the Zener diode 70a upon receiving the current of the discharge. The Zener voltage is applied to the light amount control circuit 53 as powering voltage, to operate the signal converter 64. At the same time, a current flows into the quenching circuit 66, to charge the capacitor 66a. It follows that a power supply device for the light amount control circuit 53 can have a simplified structure, because the voltage to drive the light amount control circuit 53 is obtained by means of the voltage on the secondary side to charge the main capacitor 47.

When flash light illuminates the object, part of reflected flash light comes incident upon the photo transistor 48 through the photometric window 17. The photo transistor 48 outputs a photoelectric current of a level according to intensity of the reflected flash light, to charge the signal converting capacitor 71.

When an amount of light received by the photo transistor 48 comes up to a predetermined level, a voltage across the signal converting capacitor 71 comes up to a threshold level, to render the quenching thyristor 67 conductive. The capacitor 66a in the quenching circuit 66 is discharged through a path including the resistor 66b. A voltage across the resistor 66b renders the discharging thyristor 68 conductive. Therefore, a current from the main capacitor 47 flows through the discharging thyristor 68 to discharge the main capacitor 47, to quench emission of light in the flash discharge tube 52. When the voltage across the main capacitor 47 becomes equal to or less than the predetermined level, the discharging thyristor 68 becomes non-conductive.

Therefore, the flash device is prevented from full emission of light even if an object distance is very short, or if a reflection factor of the object is very high. The photographic object illuminated with flash light can be reproduced on a photographic print at a sufficiently high density. Even if a scene includes a background illuminated not by flash light but by indoor illumination, the background can be reproduced at a sufficient brightness. Furthermore, the flash device can emanate flash light at a suitable amount even if the object distance is very long.

The time adjusting capacitor 78, which is connected in parallel with the signal converter 64, prolongs time taken for an increase in the voltage across the signal converting capacitor 71, so it is possible to keep a sufficient time for charging the capacitor 66a in the quenching circuit 66. Should a distance to the photographic object be considerably short, or should a reflection factor of the object be considerably high, the signal converting capacitor 71 can be prevented from being charged too abruptly. The discharging thyristor 68 can become conductive reliably, and be kept from operating with errors.

Figure 7:
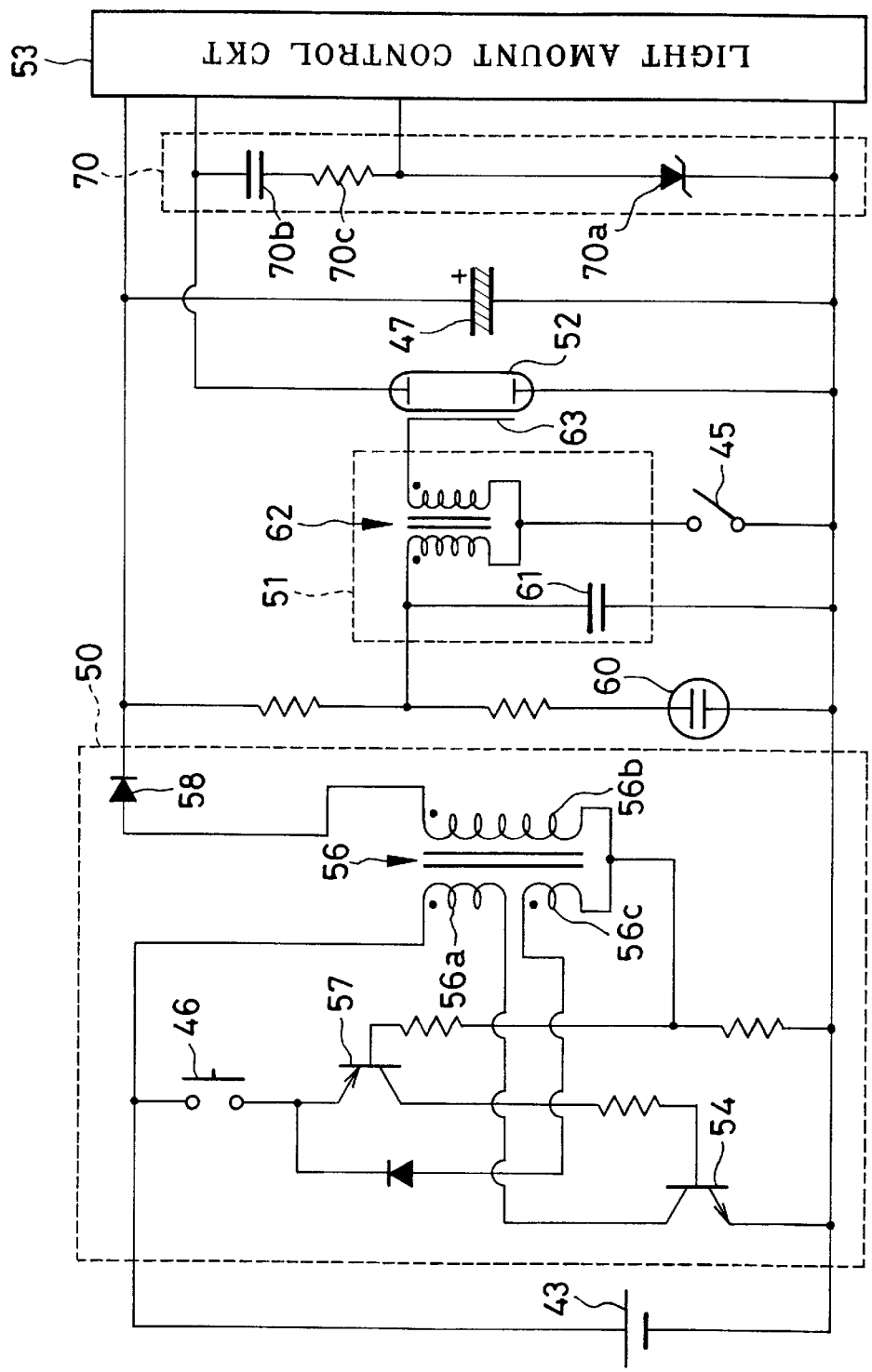
FIG. 7 is a schematic diagram illustrating another preferred embodiment according to which circuits includes a flash control circuit and the flash discharge tube.
Figure 8:
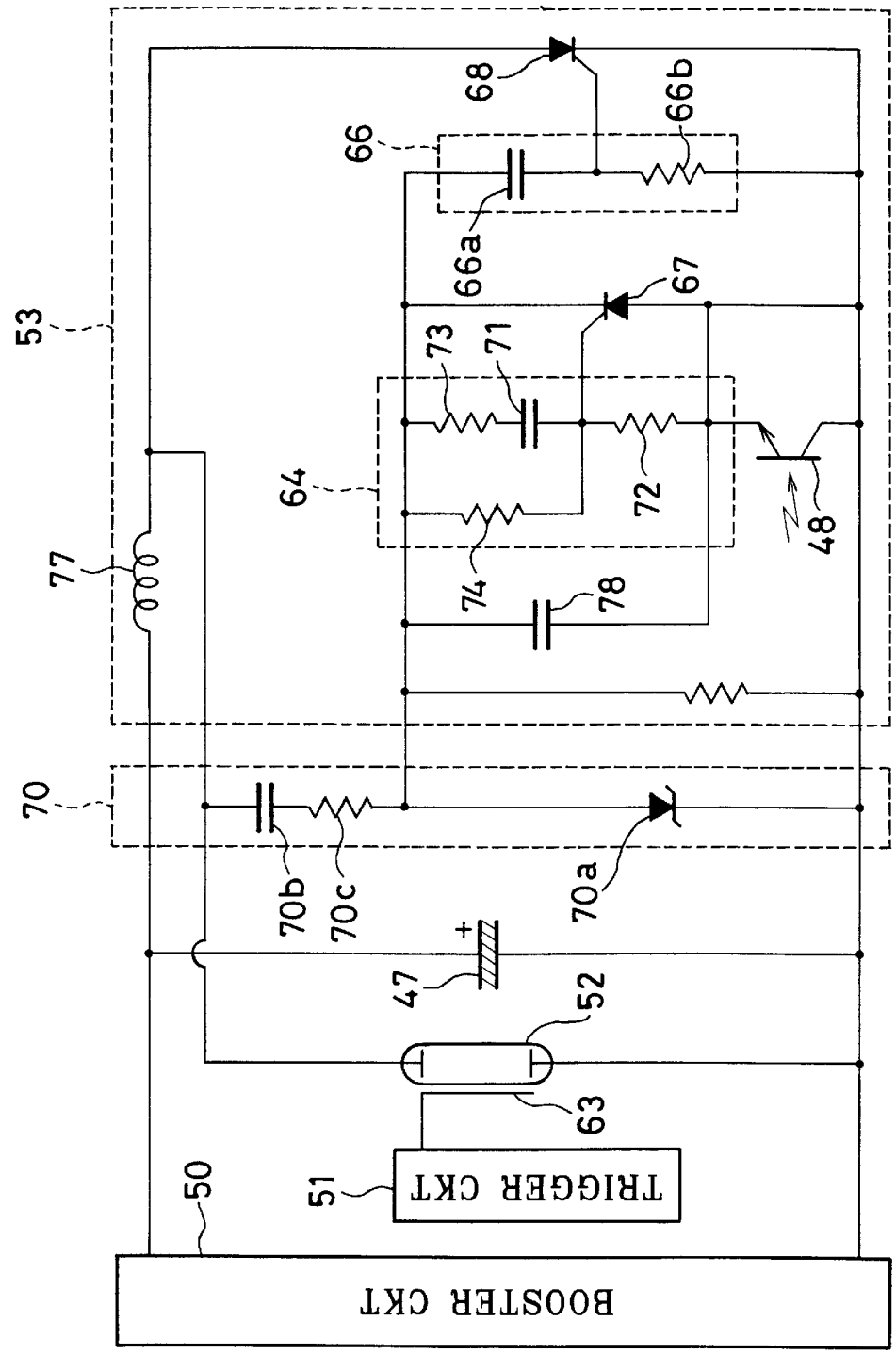
FIG. 8 is a schematic diagram illustrating the embodiment of FIG. 7 with circuits including a light amount control circuit and a powering voltage generator circuit.

In FIGS. 7 and 8, an embodiment is depicted, according to which the main capacitor 47 is charged in a positive manner. Elements similar to those of the above embodiment are designated with identical reference numerals. The primary winding 56a of the oscillation transformer 56 is connected with the light amount control circuit 53 in a manner opposite to the above embodiment with respect to the dry battery 43. The main capacitor 47 is charged in such a positive manner that the potential on the side of the negative pole of the dry battery 43 is kept constant and that the potential on the side of the positive pole of the dry battery 43 is set higher. The time adjusting capacitor 78 is connected in parallel with the signal converting capacitor 71 with respect to the photo transistor 48. Part of a photoelectric current generated by the photo transistor 48 flows to the signal converting capacitor 71, to slow the increase in the voltage across the signal converting capacitor 71. It is possible to keep sufficient the time required for the capacitor 66a to be charged.

The choke coil 77 is connected between the anode of the main capacitor 47 and the flash discharge tube 52, and keep a flow of a current gradual from the main capacitor 47 to the flash discharge tube 52. Thus, an amount of flash light emitted upon turning on the sync switch 45 can be set low, effectively to suppress occurrence of an overexposure.

Figure 9:
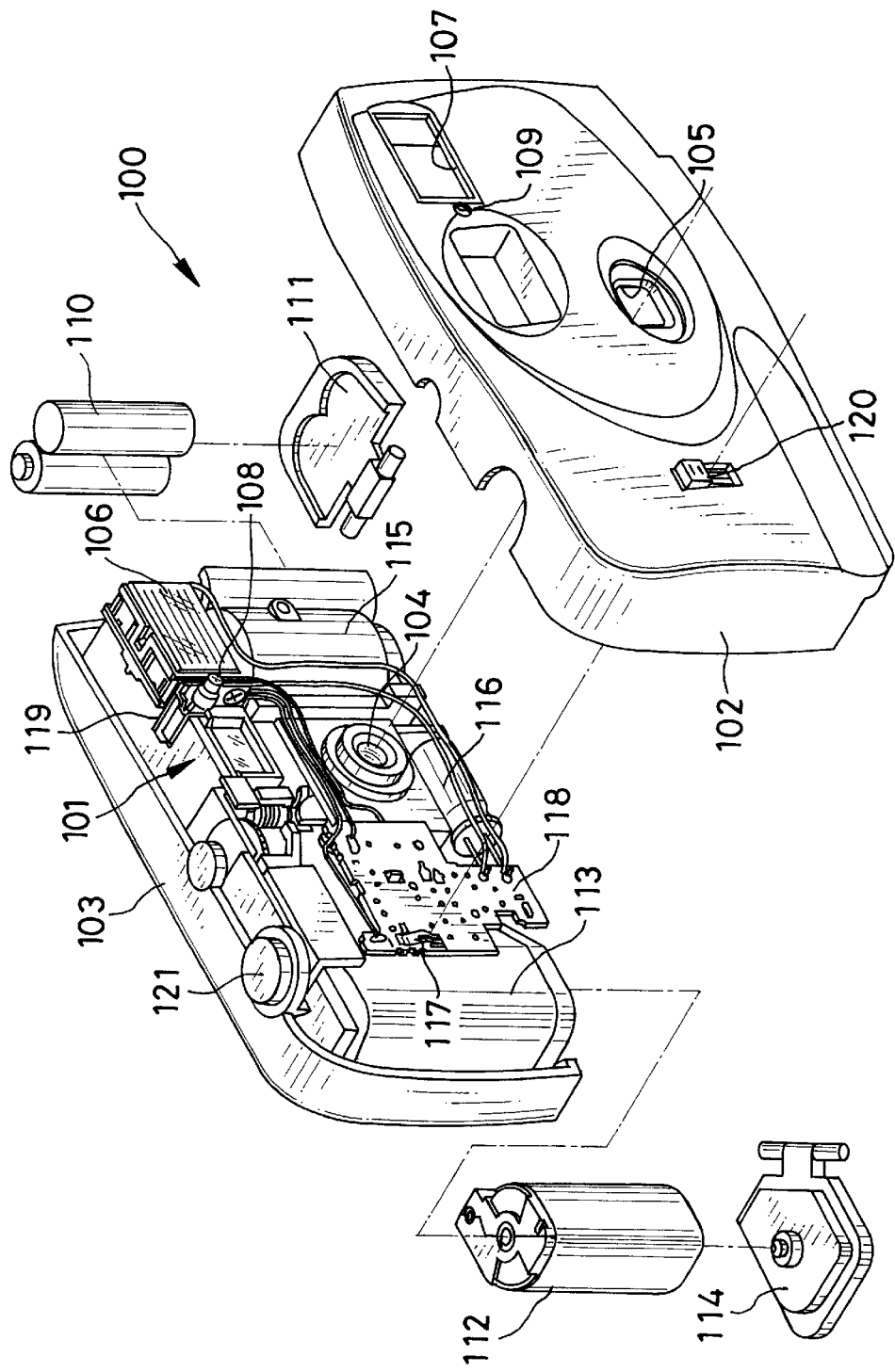
FIG. 9 is a perspective illustrating a preferred camera according to the present invention.

According to the present invention, the flash device can be incorporated in a compact camera or any known type of ordinary camera which can be reloaded with photo film. In FIG. 9, a compact camera 100 includes a main body 101, and a front cover 102 and a rear cover 103 for covering the front and rear of the main body 101. The front cover 102 includes a lens opening 105, a flash opening 107 and a photometric window 109. A taking lens 104 appears in the lens opening 105. A flash emitter 106 appears in the flash opening 107. A photo transistor 108 as photo receptor element appears in the photometric window 109, and receives reflected flash light for photometry. Batteries 110 are inserted in a battery chamber formed in a lateral portion of the main body 101. A battery chamber lid 111 is disposed on a lower side to close the battery chamber. A cassette loading chamber 113 is formed in the main body 101. A photo film cassette 112 is inserted in the cassette loading chamber 113. A lower lid 114 is closed and locked to keep the photo film cassette 112 positioned inside. A photo film chamber 115 takes up the photo film being exposed.

A main flash circuit board 118 and a subsidiary flash circuit board 119 are disposed between the main body 101 and the front cover 102. The main flash circuit board 118 has a main capacitor 116 and a charger switch 117 mounted thereon. The subsidiary flash circuit board 119 includes the photo transistor 108 mounted thereon. A charging operation button 120 as charging operation portion is disposed on the front cover 102, and turns on and off the charger switch 117. When the charging operation button 120 is slid down to turn on the charger switch 117, the booster circuit 50 starts operation to charge the main capacitor 116 and the driving capacitor 70b.

The camera 100 accommodates the shutter mechanism of a knocking type in a manner similar to the lens-fitted photo film unit 10. After completion of the charging, a shutter release button 121 is depressed to rotate a shutter blade behind the taking lens, to expose the photo film. A pair of segments of the sync switch (not shown) are contacted by each other, to apply trigger voltage of a high level to the flash discharge tube 52, to start emission of flash. At the same time, a Zener voltage occurs in the Zener diode 70a to operate the light amount control circuit 53. The photo transistor 108 is powered, and measures reflected flash light. When an amount of the reflected light becomes equal to or higher than the predetermined level, emission of flash light is quenched. Consequently, a photograph can be taken with flash light in an appropriate exposure.

Note that it is possible to use a construction for discharging the main capacitor 47 through the flash discharge tube 52 upon application of the trigger voltage in a different manner from the above combination of the booster circuit 50 and the trigger circuit 51 in the flash device. Also, switches of any non-contact type may be used in the light amount control circuit 53 instead of the thyristors 67 and 68.

In the above embodiments, performance of the signal converter 64 is lowered during the predetermined period after the start of flash emission. Alternatively, operation of the signal converter 64 may be suppressed during the predetermined period after the start of flash emission. Furthermore, the flash device according to the present invention may be incorporated in the lens-fitted photo film unit, camera or any other device for taking a photograph, and also may be a separate flash device attachable to a camera externally.

In the above embodiment, the flash device is turned on and off by sliding the charging operation button 16, 120. Also, a rotatable button, pushbutton or the like may be used for charging the flash device by rotation or depression.

Figure 10:
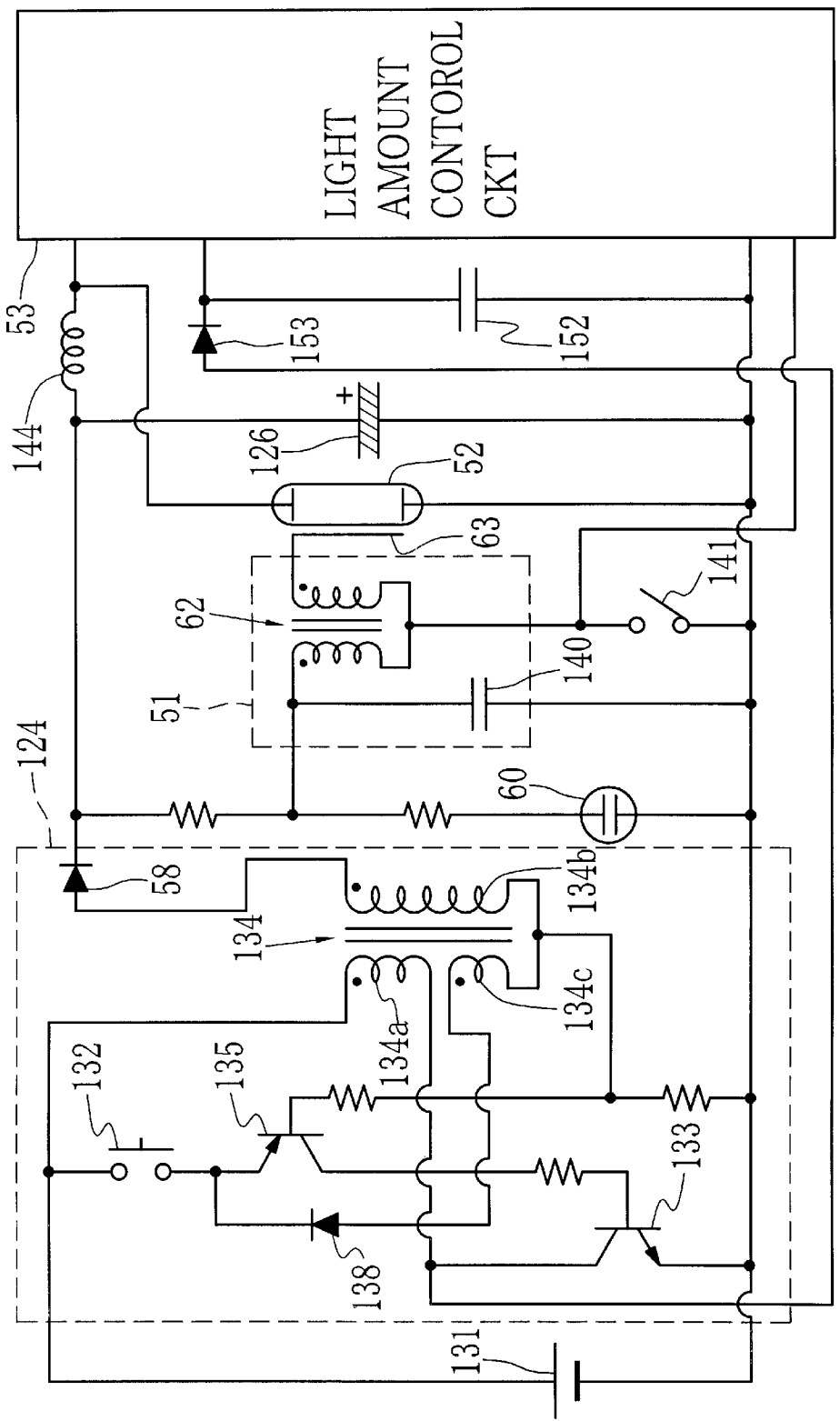
FIGS. 10 and 11 are schematic diagrams illustrating circuit according to another preferred embodiment in which powering voltage for the light amount control is obtained from the primary winding.
Figure 11:
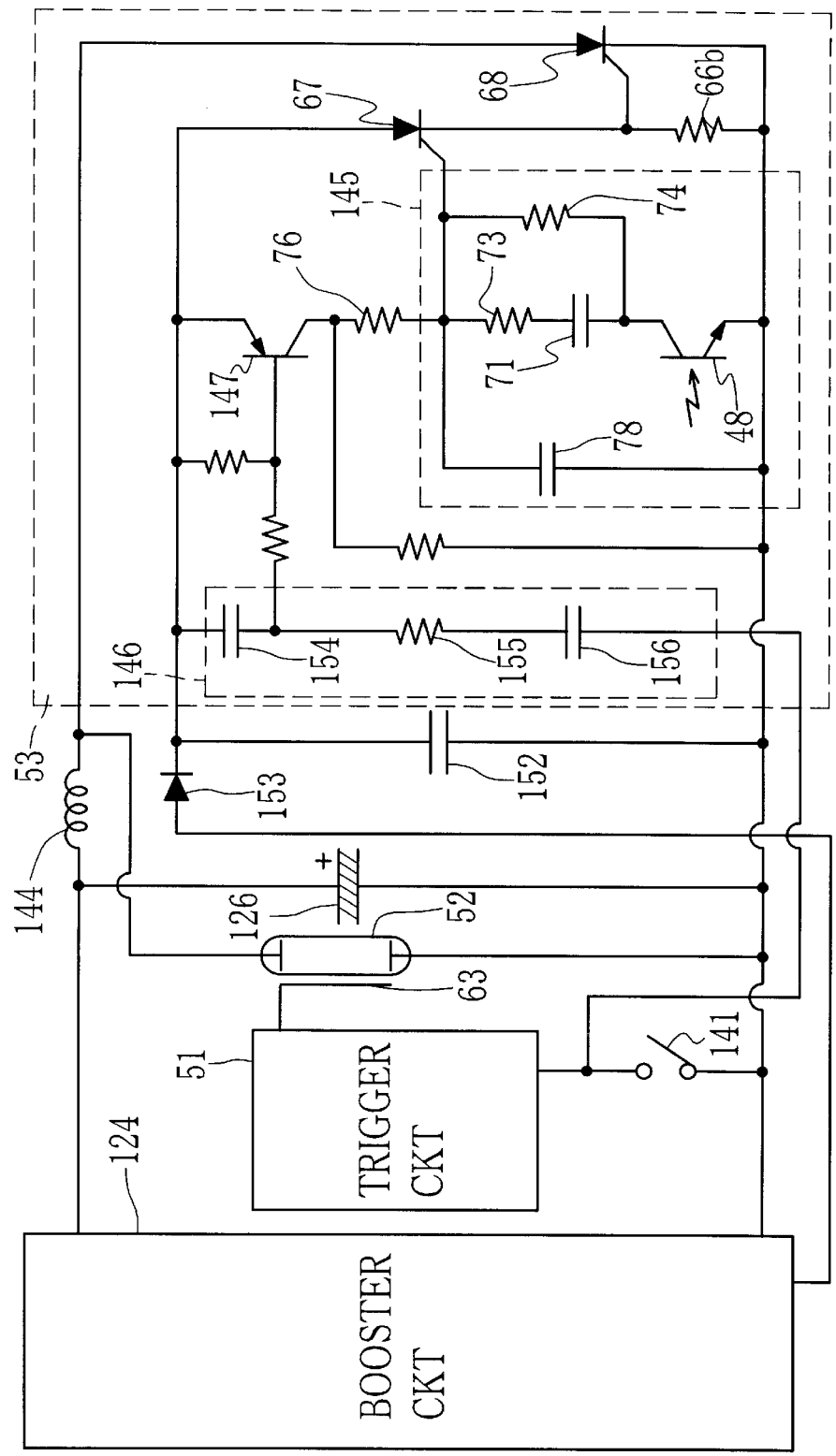

In FIGS. 10 and 11, another preferred embodiment is illustrated, in which the powering voltage for the light amount control is obtained from the primary winding. Elements similar to those in the above embodiments are designated with identical reference numerals.

An oscillation transformer 134 includes a primary winding 134a, secondary winding 134b and tertiary winding 134c. One end of the secondary winding 134b is a common terminal in connection with one end of the tertiary winding 134c. An oscillation transistor 133 includes a collector and base, the collector being connected with one end of the primary winding 134a, the base being connected with a collector of a latch transistor 135. The latch transistor 135 has an emitter and base, the emitter being connected with a positive pole of a battery 131 via a charger switch 132, the base being connected with the common terminal of the oscillation transformer 134.

When the charger switch 132 is turned on, voltage of the battery 131 is applied between the base and emitter of the latch transistor 135. A current flows through a path from the positive pole of the battery 131, the charger switch 132, the emitter and base of the latch transistor 135, and then to the negative pole of the battery 131, as a base current to the latch transistor 135. A collector current of the latch transistor 135 flows at a level according to the base current, and comes into the base of the oscillation transistor 133.

A current flowing in the secondary winding 134b is a base current flowing to the latch transistor 135. Then a collector current flows in the latch transistor 135 at a level according to the base current, and into a base of the oscillation transistor 133. This is a positive feedback loop according to which oscillation occurs with the oscillation transistor 133. Both currents on the primary and secondary sides increase. Also, electromotive force occurs in the tertiary winding 134c according to a ratio between the numbers of turns in the windings of the tertiary winding 134c and the secondary winding 134b. A feedback diode 138 is connected between the tertiary winding 134c and an emitter of the latch transistor 135. When the electromotive force generated in the tertiary winding 134c comes over a predetermined level, the feedback diode 138 becomes conductive. A feedback current flows from the tertiary winding 134c to the emitter of the latch transistor 135.

When the current on the primary side comes to saturation and does not increase, then the increase in the currents in the secondary winding 134b and the tertiary winding 134c discontinues. Back electromotive force occurs in all of the windings 134a–134c in a direction reverse to the initial direction of the electromotive force. With the back electromotive force in the secondary winding 134b, the latch transistor 135 becomes not conductive, because the secondary winding 134b applies positive voltage to its base. Then the oscillation transistor 133 becomes not conductive. After the quench of the back electromotive force, again a base current flows to the latch transistor 135, to oscillate the oscillation transistor 133.

A main capacitor 126 has a positive terminal, which is connected with the secondary winding 134b via the rectifier diode 58. A negative terminal of the main capacitor 126 is connected with a negative pole of the battery 131. The main capacitor 126 is charged by the current on the secondary side during the increase in the current on the primary side, in such a positive manner that the potential on the side of the negative pole of the dry battery is kept constant and that the potential on the side of the positive pole of the dry battery is set higher.

There is a choke coil 144 connected between the main capacitor 126 and the flash discharge tube 52 for prolonging time in increase in the current of discharge, so that an excessive current is prevented from flowing to the flash discharge tube 52 upon closing of a sync switch 141.

A rectifier diode 153 is connected between the primary winding 134a and a driving capacitor 152. Back electromotive force occurs in the primary winding 134a when the increase in the current on the primary side discontinues.

Then a current flows through a path from the positive pole of the battery 131, the primary winding 134a, the rectifier diode 153, the driving capacitor 152 and to the negative pole of the battery 131. The driving capacitor 152 is charged with voltage determined according to the back electromotive force.

A bypass circuit 146 includes a shunt capacitor 154, a resistor 155 and a capacitor 156. A switching transistor 147 has a base and emitter, between which the shunt capacitor 154 is connected. The resistor 155 and the capacitor 156 are connected between the shunt capacitor 154 and the sync switch 141. When the sync switch 141 is closed with the driving capacitor 152 charged, a current flows from the driving capacitor 152 to the bypass circuit 146, to charge the shunt capacitor 154. Voltage across the shunt capacitor 154 is applied between a base and emitter of the switching transistor 147. When a predetermied time lapses, the voltage across the shunt capacitor 154 comes over a predetermined level. So the switching transistor 147 becomes conductive. Powering voltage is applied to a light receiving circuit 145 in correspondence with the voltage across the driving capacitor 152. Therefore, the light receiving circuit 145 is energized and measures light.

In operation of the embodiment, at first a user depresses a charging operation button for flash emission. The charger switch 132 is turned on to start a booster circuit 124 to operate. A current is output by the booster circuit 124 and charges the main capacitor 126 and a trigger capacitor 140. When the output current decreases, there occurs back electromotive force in all of the windings 134a–134c. With the back electromotive force in the primary winding 134a, a charging current flows to the driving capacitor 152 via the rectifier diode 153, to charge the driving capacitor 152.

When the sync switch 141 is closed by releasing the shutter, a current flows from the driving capacitor 152 via the bypass circuit 146 to the sync switch 141. When the voltage across the shunt capacitor 154 comes over the predetermied level, the switching transistor 147 becomes conductive. The light receiving circuit 145 or signal converter is supplied with voltage across the driving capacitor 152. Then the light receiving circuit 145 is powered.

Furthermore, an LED (light-emitting diode) may be connected in parallel with the tertiary winding 134c instead of using the neon tube 60. When the electromotive force generated in the tertiary winding 134c decreases with a decrease in the charging current, the LED may be energized to illuminate. This structure is advantageous, because of a low cost without necessity of the neon tube 60.

Figure 12:
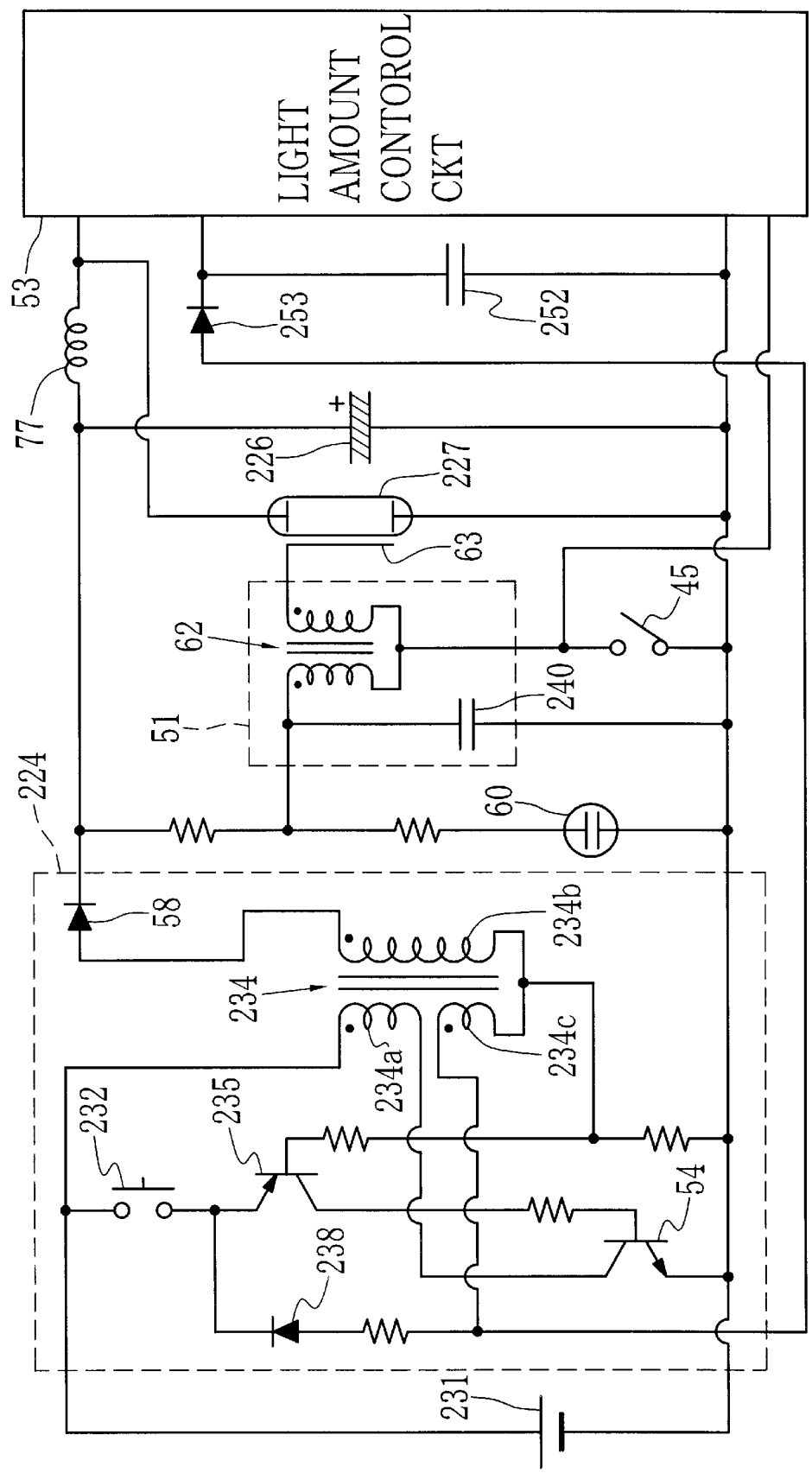
FIGS. 12 and 13 are schematic diagrams illustrating circuit according to still another preferred embodiment in which powering voltage for the light amount control is obtained from the tertiary winding.
Figure 13:
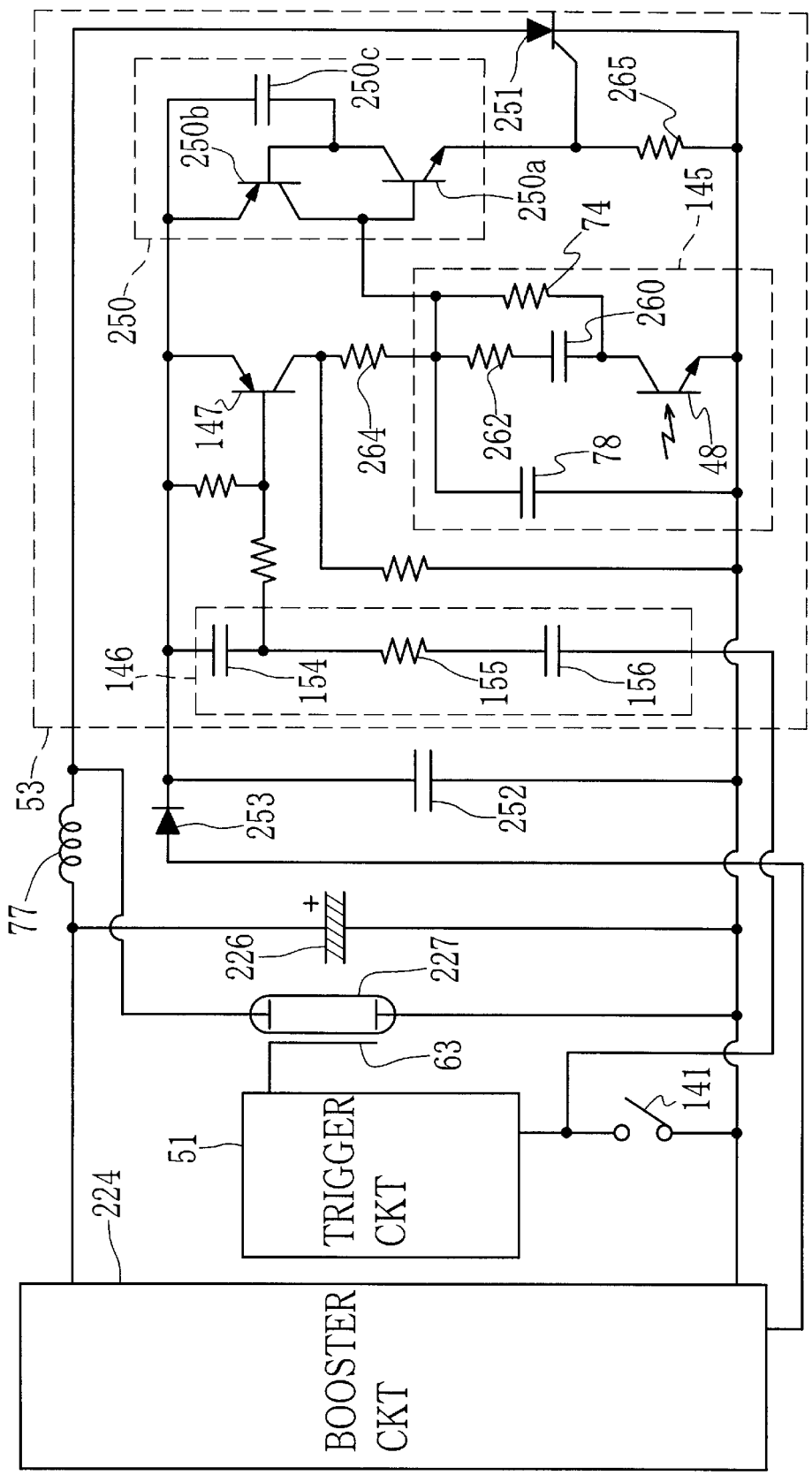

In FIGS. 12 and 13, still another preferred embodiment is illustrated, in which the powering voltage for the light amount control is obtained from the tertiary winding in the booster. Elements similar to those in the above embodiments are designated with identical reference numerals.

A tertiary winding 234c is coupled with a secondary winding 234b in mutual induction. When a current on the secondary side in the secondary winding 234b increases and decreases, electromotive force occurs across the tertiary winding 234c according to a ratio in the numbers of turns of it and the secondary winding 234b. A feedback diode 238 is connected between an emitter of a latch transistor 235 and the tertiary winding 234c. When the electromotive force in the tertiary winding 234c becomes higher than the forward voltage across the feedback diode 238, then a feedback current flows from the tertiary winding 234c to the emitter of the latch transistor 235. After this, occurrence of back electromotive force and oscillation are similar to the above embodiment.

A rectifier diode 253 is connected between a driving capacitor 252 and the tertiary winding 234c illustrated in FIG. 12. An anode of the rectifier diode 253 is directed to the tertiary winding 234c. A cathode of the rectifier diode 253 is directed to a positive terminal of the driving capacitor 252. During an increase in the current on the secondary side, voltage is generated across the tertiary winding 234c in the forward direction at a level of several volts. The current flows through a path from the tertiary winding 234c, the rectifier diode 253, the driving capacitor 252 and to the tertiary winding 234c, to charge the driving capacitor 252 with a voltage determined according to the electromotive force in the tertiary winding 234c. However, the rectifier diode 253 does not become conductive if small electromotive force occurs in the tertiary winding 234c, or if back electromotive force occurs in the tertiary winding 234c. No current flows to the driving capacitor 252 for charging.

A switching unit 250 includes transistors 250a and 250b and a capacitor 250c. A base of the transistor 250a is connected to a connection point between resistors 262 and 264. Also, a collector of the transistor 250b is connected to the same connection point. The transistor 250a has a collector, which is connected with a base of the transistor 250b. A resistor 265 is connected between an emitter of the transistor 250a and one terminal of the driving capacitor 252. A remaining terminal of the driving capacitor 252 is connected with an emitter of the transistor 250b.

In the switching unit 250, when voltage across a capacitor 260 comes up to a predetermined level, both of the transistors 250a and 250b are rendered conductive. A discharging current from the driving capacitor 252 flows to the resistor 265. Note that the capacitor 250c is used for preventing the switching unit 250 from turning on upon occurrence of electrical noise.

In operation of the embodiment, at first a user depresses a charging operation button for flash emission. A charger switch 232 is turned on to start a booster circuit 224 to operate. A current is output by the booster circuit 224 and charges a main capacitor 226 and a trigger capacitor 240. Electromotive force occurs in the tertiary winding 234c at a level of several volts upon an increase in the current on the secondary side. The electromotive force causes a charging current to flow to the driving capacitor 252 via the rectifier diode 253, to charge the driving capacitor 252.

When a voltage across the capacitor 260 comes over a predetermined level by receiving reflected flash light, the switching unit 250 becomes conductive. A current flows from the driving capacitor 252 through the switching unit 250 and the resistor 265, to discharge the driving capacitor 252. A voltage generated across the resistor 265 is applied between the gate and cathode of a discharging thyristor 251, to render the discharging thyristor 251 conductive. A current flows from the main capacitor 226 through the discharging thyristor 251, to discharge the main capacitor 226. Thus, emission of flash light in a flash discharge tube 227 is quenched. When the voltage across the main capacitor 226 becomes equal to or lower than the predetermined level, then the discharging thyristor 251 becomes not conductive.

Figure 14:
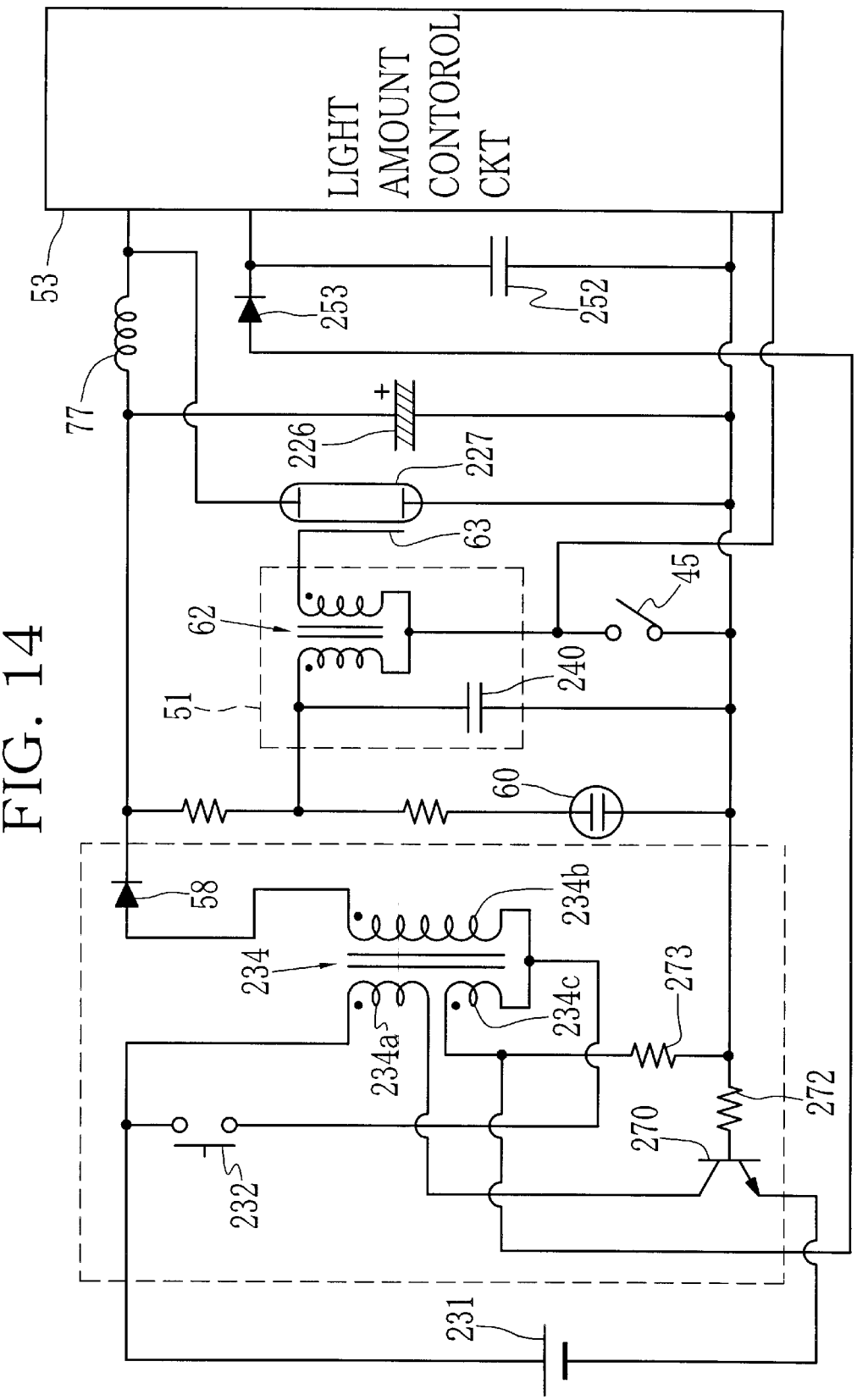
FIG. 14 is a schematic diagram illustrating an embodiment of arrangement of circuits including another preferred booster circuit.

In FIG. 14, an additional preferred booster circuit is depicted. An n-p-n type of oscillation transistor 270 has a base, collector and emitter, the base being connected with one end of the tertiary winding 234c via resistors 272 and 273. The collector is connected with one end of a primary winding 234a. The emitter of the oscillation transistor 270 is connected with a negative pole of a battery 231.

When the charger switch 232 is turned on, a current from the battery 231 flows in the tertiary winding 234c and to a base of the oscillation transistor 270, to render the oscillation transistor 270 conductive. A collector current in the oscillation transistor 270 flows in the primary winding 234a, to generate electromotive force in the secondary winding 234b by mutual induction. The voltage across the secondary winding 234b charges the main capacitor 226. The current from the secondary winding 234b partially flows to a base of the oscillation transistor 270 via the tertiary winding 234c. This is feedback operation causing oscillation of the oscillation transistor 270, to increase currents on the primary and secondary sides.

During the increase in the current on the secondary side, electromotive force occurs in the tertiary winding 234c at a level of several volts, which causes a charging current to flow to the driving capacitor 252. Thus the driving capacitor 252 is charged. Remaining portions of the embodiment are similar to those of the above embodiments.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A flash device comprising:
    a booster circuit including primary and secondary windings, said secondary winding generating high voltage when power source voltage is applied to said primary winding;
    a main capacitor for being charged by said high voltage in said secondary winding;
    a flash discharge tube, connected in parallel with said main capacitor, for emitting flash light upon discharge with electric energy from said main capacitor;
    a trigger circuit for discharging said flash discharge tube upon a switching operation;
    a photo receptor element for measuring reflected light from an object illuminated by said flash light, to output a light amount signal;
    a light amount control circuit for quenching discharge of said flash discharge tube when an integration value of said light amount signal comes up to a predetermined value;
    a powering voltage generator circuit, connected with said secondary winding, for generating powering voltage adapted for powering said light amount control circuit in response to operation of said trigger circuit;
    wherein said light amount control circuit comprises:
        a first capacitor arranged in the light amount control circuit to integrate said light amount signal;
        a first switching element electrically connected with respect to the first capacitor so that the first switching element becomes conductive when a voltage across said first capacitor comes up to said predetermined value;
        a second capacitor separate from the first capacitor, and electrically connected so that the second capacitor can be charged by application of said powering voltage, and also electrically connected so that the second capacitor is discharged when said first switching element becomes conductive;
        a second switching element electrically connected so that it becomes conductive upon discharge of said second capacitor, the second switching element being further electrically connected so that, when conductive, it discharges the main capacitor, thereby quenching emission of said flash light from said flash discharge tube.

2. A flash device as defined in claim 1, wherein said powering voltage generator circuit includes:
    a driving capacitor for being charged by said high voltage in said secondary winding, and for being discharged through said flash discharge tube in response to operation of said trigger circuit;
    a Zener diode, connected in series with said driving capacitor, for generating said powering voltage upon discharge of said driving capacitor.

3. A flash device as defined in claim 2, wherein said photo receptor element is a photo transistor, connected in series with said first capacitor, for being supplied with said powering voltage by said powering voltage generator circuit, to generate a current constituting said light amount signal according to said object light amount.

4. A flash device as defined in claim 3, wherein said first switching element is a first thyristor having a first gate, connected in parallel with a series of said photo transistor and said first capacitor, said first gate being connected with a juncture point between said photo transistor and said first capacitor;
    said second switching element is a second thyristor having a second gate, connected in parallel with said main capacitor, said second gate being connected with said second capacitor.

5. A flash device as defined in claim 4, further comprising a choke coil, connected between an anode of said second thyristor and said main capacitor, for protecting said second thyristor by preventing a current from flowing at a high frequency from said main capacitor to said second thyristor.

6. A flash device as defined in claim 5 wherein said flash discharge tube has one end connected between said choke coil and an anode of said second thyristor.

7. A flash device as defined in claim 4, further comprising a time adjusting capacitor, connected in series with said first thyristor, for increasing time before rendering said first thyristor conductive.

8. A flash device as defined in claim 1, further comprising:
    a front wall;
    a flash emitter, secured to said front wall, for containing said flash discharge tube, to emit said flash light to said object; and
    a charging operation portion, disposed in said front wall, for being externally actuated, to turn on said booster circuit.

9. A flash device as defined in claim 8 further comprising a sync switch having a pair of switch segments for being shifted to a contacted state by a shutter mechanism upon actuation thereof, to switch on said trigger circuit.

10. A lens-fitted photo film unit comprising:
    a main body pre-loaded with photo film;
    a booster circuit, including primary and secondary windings, said secondary winding generating high voltage when power source voltage is applied to said primary winding;
    a main capacitor for being charged by said high voltage in said secondary winding;
    a flash discharge tube, connected in parallel with said main capacitor, for emitting flash light upon discharge with electric energy from said main capacitor;
    a trigger circuit for discharging said flash discharge tube upon a switching operation;

a photo receptor element for measuring reflected light from an object illuminated by said flash light, to output a light amount signal;

a light amount control circuit for quenching discharge of said flash discharge tube when an integration value of said light amount signal comes up to a predetermined value;

a powering voltage generator circuit, connected with said secondary winding, for generating powering voltage adapted for powering said light amount control circuit in response to operation of said trigger circuit;

wherein said light amount control circuit comprises:
 a first capacitor arranged in the light amount control circuit to integrate said light amount signal;
 a first switching element electrically connected with respect to the first capacitor so that the first switching element becomes conductive when a voltage across said first capacitor comes up to said predetermined value;
 a second capacitor separate from the first capacitor, and electrically connected so that the second capacitor can be charged by application of said powering voltage, and also electrically connected so that the second capacitor is discharged when said first switching element becomes conductive;
 a second switching element electrically connected so that it becomes conductive upon discharge of said second capacitor, the second switching element being further electrically connected so that, when conductive, it discharges the main capacitor, thereby quenching emission of said flash light from said flash discharge tube.

11. A lens-fitted photo film unit as defined in claim 10, wherein said powering voltage generator circuit includes:
 a driving capacitor for being charged by said high voltage in said secondary winding, and for being discharged through said flash discharge tube in response to operation of said trigger circuit;
 a Zener diode, connected in series with said driving capacitor, for generating said powering voltage upon discharge of said driving capacitor.

12. A lens-fitted photo film unit as defined in claim 11, further comprising:
 a shutter mechanism, including a shutter blade, secured in said main body, for providing an exposure to said photo film; and
 a sync switch having a pair of switch segments for being shifted to a contacted state by a portion of said shutter blade upon actuation of said shutter mechanism, to switch on said trigger circuit.

13. A lens-fitted photo film unit as defined in claim 12, further comprising a choke coil, connected between an anode of said second thyristor and said main capacitor, for protecting said second thyristor by preventing a current from flowing at a high frequency from said main capacitor to said second thyristor.

14. A lens-fitted photo film unit as defined in claim 13, wherein said photo receptor element is disposed on a front side of said main body;
further comprising:
 a front cover for covering said front side of said main body; and
 a photometric window, formed in said front cover, for passing said reflected light from said object to said photo receptor element.

15. A lens-fitted photo film unit as defined in claim 14, wherein said photo receptor element is a photo transistor, connected in series with said first capacitor, for being supplied with said powering voltage by said powering voltage generator circuit, to generate a current constituting said light amount signal according to said object light amount.

16. A lens-fitted photo film unit as defined in claim 15, wherein said first switching element is a first thyristor having a first gate, connected in parallel with a series of said photo transistor and said first capacitor, said first gate being connected with a juncture point between said photo transistor and said first capacitor;

said second switching element is a second thyristor having a second gate, connected in parallel with said main capacitor, said second gate being connected with said second capacitor.

17. A lens-fitted photo film unit as defined in claim 16, further comprising a charging operation portion, disposed in said front cover, for being externally actuated, to turn on said booster circuit.

18. A lens-fitted photo film unit as defined in claim 16, further comprising:
 a flash circuit board having said booster circuit, said main capacitor, said flash discharge tube, said trigger circuit, said photo transistor, said light amount control circuit, and said powering voltage generator circuit; and
 a positioning mechanism for positioning said flash circuit board between said main body and said front cover.

19. A lens-fitted photo film unit as defined in claim 16, further comprising a battery, contained in said main body, for generating said power source voltage.

20. A camera having a main body for being loaded with photo film, comprising:
 a booster circuit, including primary and secondary windings, said secondary winding generating high voltage when power source voltage is applied to said primary winding;
 a main capacitor for being charged by said high voltage in said secondary winding;
 a flash discharge tube, connected in parallel with said main capacitor, for emitting flash light upon discharge with electric energy from said main capacitor;
 a trigger circuit for discharging said flash discharge tube upon a switching operation;
 a photo receptor element for measuring reflected light from an object illuminated by said flash light, to output a light amount signal;
 a light amount control circuit for quenching discharge of said flash discharge tube when an integration value of said light amount signal comes up to a predetermined value;
 a powering voltage generator circuit, connected with said secondary winding, for generating powering voltage adapted for powering said light amount control circuit in response to operation of said trigger circuit;
 wherein said light amount control circuit comprises:
  a first capacitor arranged in the light amount contril circuit to integrate said light amount signal;
  a first switching element electrically connected with respect to the first capacitor so that the first switching element becomes conductive when a voltage across said first capacitor comes up to said predetermined value;
  a second capacitor separate from the first capacitor, and electrically connected so that the second capacitor can be charged by application of said powering voltage, and also electrically connected so that the second capacitor is discharged when said first switching element becomes conductive;

a second switching element electrically connected so that it becomes conductive upon discharge of said second capacitor, the second switching element being further electrically connected so that, when conductive, it discharges the main capacitor, thereby quenching emission of said flash light from said flash discharge tube.

21. A camera as defined in claim 20, further comprising:

a shutter mechanism, including a shutter blade, secured to said main body, for providing an exposure to said photo film; and a sync switch having a pair of switch segments for being shifted to a contacted state by a portion of said shutter blade upon actuation of said shutter mechanism, to switch on said trigger circuit.

22. A camera as defined in claim 21, wherein said photo receptor element is disposed on a front side of said main body;

further comprising:

a front cover for covering said front side of said main body; and a photometric window, formed in said front cover, for passing said reflected light from said object to said photo receptor element.

23. A lens-fitted photo film unit producing method for producing a lens-fitted photo film unit, said lens-fitted photo film unit comprising:

a main body pre-loaded with photo film;

a front cover for covering a front side of said main body;

a booster circuit, including primary and secondary windings, said secondary winding generating high voltage when power source voltage is applied to said primary winding;

a main capacitor for being charged by said high voltage in said secondary winding;

a flash discharge tube, connected in parallel with said main capacitor, for emitting flash light upon discharge with electric energy from said main capacitor;

a trigger circuit for discharging said flash discharge tube upon a switching operation;

a photo receptor element for measuring reflected light from an object illuminated by said flash light, to output a light amount signal;

a light amount control circuit for quenching discharge of said flash discharge tube when an integration value of said light amount signal comes up to a predetermined value;

a powering voltage generator circuit, connected with said secondary winding, for generating powering voltage adapted for powering said light amount control circuit in response to operation of said trigger circuit;

a flash circuit board having said booster circuit, said main capacitor, said flash discharge tube, said trigger circuit, said photo receptor element, said light amount control circuit, and said powering voltage generator circuit;

a charging operation portion, disposed in said front wall, for being externally actuated, to turn on said flash circuit board; and a photometric window, formed in said front cover, for passing said reflected light from said object to said photo receptor element;

said lens-fitted photo film unit producing method comprising steps of:

securing said flash circuit board to said main body;

securing said front cover to said main body in positioning said photometric window at said photo receptor element in said main body, and in positioning said charging operation portion at said flash circuit board in said main body.

24. A lens-fitted photo film unit producing method as defined in claim 23, further comprising steps of:

securing a shutter mechanism to said main body, said shutter mechanism including a shutter blade for providing an exposure to said photo film; and securing a sync switch to said main body in a predetermined position relative to said shutter blade in said main body before said front cover is secured to said main body, said sync switch being shifted to a contacted state by a portion of said shutter blade upon actuation of said shutter mechanism, to switch on said trigger circuit.

25. A lens-fitted photo film unit producing method as defined in claim 24, further comprising steps of:

inserting a photo film cassette in a cassette loading chamber in said main body;

in said step of inserting said photo film cassette, inserting said photo film into a photo film chamber in said main body in a form wound as said roll after being drawn from said photo film cassette; and after said steps of inserting said photo film cassette and said photo film, securing said rear cover to said main body before said step of securing said front cover, wherein said rear cover closes said cassette loading chamber and said photo film chamber.

26. A flash device comprising:

an oscillation transformer, including primary and secondary windings coupled with each other in mutual induction, there occurring an induction current flowing in a secondary winding upon flowing of a current in said primary winding, said induction current adapted for charging a main capacitor;

a flash discharge tube, triggered by application of trigger voltage, for emitting flash light by discharging said main capacitor being charged;

a light amount control circuit for receiving said flash light reflected by an object to be photographed, and for quenching discharge of said flash discharge tube when an amount of said received reflected flash light comes up to a predetermined level; and a driving capacitor for being charged by back electromotive force generated in said primary winding, and for generating powering voltage adapted for powering said light amount control circuit in emitting said flash light.

27. A flash device as defined in claim 26, wherein said flash device is incorporated in a lens-fitted photo film unit, and a battery is accommodated in said lens-fitted photo film unit, and connected with said primary winding.

28. A flash device comprising:

an oscillation transformer, including primary, secondary and tertiary windings coupled with one other in mutual induction, there occurring an induction current flowing in a secondary winding upon flowing of a current in said primary winding, said induction current adapted for charging a main capacitor;

a flash discharge tube, triggered by application of trigger voltage, for emitting flash light by discharging said main capacitor being charged;

a light amount control circuit for receiving said flash light reflected by an object to be photographed, and for quenching discharge of said flash discharge tube when an amount of said received reflected flash light comes up to a predetermined level; and a driving capacitor for being charged by electromotive force of induction generated in said tertiary winding by changes in a current flowing in said secondary winding, and for generating powering voltage adapted for powering said light amount control circuit in emitting said flash light.

29. A flash device as defined in claim 28, wherein said flash device is incorporated in a lens-fitted photo film unit, and a battery is accommodated in said lens-fitted photo film unit, and connected with said primary winding.

* * * * *